United States Patent
Farrar et al.

[15] 3,692,874

[45] Sept. 19, 1972

[54] PROCESS OF COUPLING ALKALI METAL-TERMINATED POLYMERS WITH SILICIC COMPOUND IN PRESENCE OF CONJUGATED DIENES

[72] Inventors: Ralph C. Farrar; Clinton F. Wofford, both of c/o Phillips Petroleum Company, Bartlesville, Okla. 74003

[22] Filed: Sept. 2, 1970

[21] Appl. No.: 69,189

[52] U.S. Cl..........260/880 B, 260/85.1, 260/94.2 M, 260/94.7 A, 260/94.7 HA, 260/94.7 S, 260/94.7 N
[51] Int. Cl. ........C08f 19/08, C08f 27/04, C08d 5/02
[58] Field of Search.........260/880 B, 94.7 R, 94.7 A, 260/94.7 HA, 85.1, 83.7

[56] References Cited

UNITED STATES PATENTS

| | | | |
|---|---|---|---|
| 3,281,383 | 10/1966 | Zelinski et al. | 260/880 |
| 3,244,664 | 4/1966 | Zelinski et al. | 260/94.7 |
| 3,468,972 | 9/1969 | Hsiek | 260/94.7 |

*Primary Examiner*—James A. Seidleck
*Attorney*—Young and Quigg

[57] ABSTRACT

The coupling of alkali metal-terminated polymers with silicic coupling agents is significantly improved, both as to the rate of coupling and the efficiency of coupling, by the inclusion of a conjugated diene in a coupling procedure with the silicic coupling compound.

12 Claims, No Drawings

PROCESS OF COUPLING ALKALI METAL-TERMINATED POLYMERS WITH SILICIC COMPOUND IN PRESENCE OF CONJUGATED DIENES

This invention relates to the use of accelerators to improve the coupling of alkali metal-terminated polymers.

We have discovered that the rate of coupling is substantially increased, the time of coupling significantly reduced, and the final Mooney value of the resulting coupled polymer is greatly increased, all by the inclusion of small amounts of a conjugated diene in the coupling of alkali metal-terminated polymers in which the terminal moiety is derived from a vinylidene group-containing aromatic compound with silicic coupling compounds. The use of silicic coupling compounds, of course, in the coupling of alkali metal-terminated polymers is a known procedure.

It is an object of our invention to speed the coupling of alkali metal-terminated polymers in which the terminal moiety is derived from a vinylidene group-containing aromatic compound.

It is a further object of our invention to increase the Mooney value of resulting coupled polymers.

Other aspects, objects, and the several advantages of our invention will be apparent to one skilled in the art from the following description and our appended claims.

The accelerators useful in improving the silicic compound coupling of the aforedescribed polymers are conjugated dienes containing from four to 12 carbon atoms per molecule, preferably from four to eight carbon atoms per molecule, and the presently preferred diene is 1,3-butadiene or isoprene. Conjugated dienes containing halogen and alkoxy substituents also can be employed. The conjugated diene is added to the polymerization mixture containing the alkali metal-terminated polymer prior to, concurrent with, or just subsequent to the addition of a silicic coupling agent.

The alkali metal-terminated polymers to which our invention is applicable are those polymers containing a terminal moiety derived from a vinyl-substituted aromatic compound. Such terminal moieties, having alkali metal attached thereto, impart a yellow or orange color to the polymerization mixture. It is the coupling of such structures with a silicic type coupling agent which is benefited by the addition of the conjugated diene coupling accelerators according to the process of our invention.

In general, at least one mole of diene coupling accelerator should be added for each gram equivalent of alkali metal attached to the terminal moiety derived from a vinyl-substituted aromatic compound. A small excess of the coupling accelerator often is suitably employed, though generally not more than about 20 moles of coupling accelerator, and not less than 0.5 moles of coupling accelerator, are employed for each gram equivalent of alkali metal present in the polymeric composition. More usually the range is from one to 10 moles of diene per gram equivalent of alkali metal.

The silicic compounds useful in the practice of our invention act to couple polymer molecules prepared by the organoalkali metal catalysts as described above through a silicon atom. These silicic compounds include the silicon polyhalides, the silanes, and siloxanes both open chain and cyclic. Of course, the silanes or other active silicon compounds must contain at least two reactive groups for coupling purposes. One of the reactive groups is employed in the reaction with an alkali metal-terminated polymer, and the remaining active group enables the now silicon-containing polymer to be coupled with another alkali metal-terminated polymer and/or cured by reaction with other known suitable reagents alone or in combination with auxiliary curatives.

The diene coupling accelerator can be added to the alkali metal-terminated polymer subsequent to formation thereof, and prior to, concurrent with, or even shortly subsequent to, the addition of the silicon-containing coupling agent. When the diene coupling accelerator is added prior to the addition of the silicic coupling agent and if unreacted vinyl-substituted aromatic compound is still present in the mixture, the silicic coupling agent then must be added before the orange or yellow color is again evident in the polymeric formulation. When the diene coupling accelerator is added subsequently to the addition of the silicic coupling agent, the only limitation is that of diminishing returns since it is apparent that too long a delay will lose the advantages of accelerated coupling.

The following examples demonstrate the effectiveness of our invention. Specific examples, reactants, conditions, are intended to be illustrative and not limitative of the scope of our invention.

EXAMPLE

A series of runs were made comparing inherent viscosity and Mooney viscosity values of polymers without the addition of either a silicic coupling agent or a diene coupling accelerator, with a silicic coupling agent alone at different lengths of coupling time, and with both the coupling agent and our coupling accelerator.

The polymerization recipe utilized was as follows:

TABLE I

| | | |
|---|---|---|
| Butadiene | 75 | parts by weight |
| Styrene | 25 | parts by weight |
| Cyclohexane (diluent) | 760 | parts by weight |
| Tetrahydrofuran (randomizing agent) | 1.5 | parts by weight |
| Initiator | 1.80 | meqhm |
| Coupling agent | Variable (see Table II) | |
| Coupling accelerator | Variable (See Table II) | | meqhm=gram milliequivalents per 100 g of monomer(s).

The initiator was prepared in a separate reactor by charging 82 ml cyclohexane, followed by nitrogen purge, charging 3.7 ml butadiene, 2.15 ml (3.75 mmoles, 0.487 grams) divinylbenzene, 9.62 ml (15.0 mmoles) butyllithium, reacting at 158° F. for 40 minutes followed by cooling. The butyllithium was added to the reaction mixture as a 1.56 M solution in n-heptane.

The reaction components were charged in the following order: cyclohexane, followed by nitrogen purge at the rate of 3 liters per minute for 5 minutes, butadiene, styrene, tetrahydrofuran, and initiator. The mixture was heated to reaction temperature of 158° F. and held at this temperature for 28 minutes. The orange color of the polymerized mixture indicated styryl end-groups. Coupling agent and coupling accelerator were added at the end of the 28 minute polymerization interval while the temperature was maintained at 158° F. for an additional time as indicated in Table II.

Using the polymerization reaction mixture as described, and adding varying amounts of coupling agent, without and with a coupling accelerator, the following results were obtained:

TABLE II

| Run No. | Coupling Agent methyl-silicon Trichloride MHM[2] | Coupling Accelerator MHM Butadiene | Coupling Time Minutes | % Conversion | Inherent vis ML-4 -cos -ity |
|---|---|---|---|---|---|
| 1 | 0 | — | — | 97.4 | 1.15 11.5 |
| 2 | 0.45 | — | 5 | 99.0 | 1.91 65 |
| 3 | 0.45 | — | 60 | 99.0 | 2.21 92 |
| 4 | 0.45 | 5.7[1] | 1 | 99.6 | 2.66 151 |
| 5 | 0.45 | 11.5[1] | 1 | 99.6 | 2.85 162 |

[1] Coupling accelerator added after the coupling agent was thoroughly mixed into the polymer.
[2] MHM is gram millimoles per 100 g of monomer.

Run 1 above is a control run without the addition of coupling agent or coupling accelerator. Runs 2 and 3 are control runs showing the use of a silicic coupling agent at coupling times of from 5 minutes to 60 minutes, and illustrating a maximum Mooney value at 60 minutes in Run 3 of 92.

Runs 4 and 5 demonstrate our invention with the use of the coupling agent plus the diene coupling accelerator. Runs 4 and 5 use the same amount of coupling agent as did control Runs 2 and 3. Coupling time in runs of the invention 4 and 5 are only 1 minute, as opposed to from 5 to 60 minutes for control runs 2 and 3. Thus by our invention only from 1/5 to 1/60 as much time as previously required. Further, Mooney values obtained were greater than 150, as opposed to a maximum of little over 90 without our coupling accelerator.

The results as illustrated in Table II also were confirmed by GPC (Gel Permeation Chromatography) analyses which illustrated in dramatic fashion the disappearance of the original polymer, and the shift to large amounts of coupled high molecular weight polymers which were formed in only 1 minute by the process of the invention. Similar GPC analyses using the same amount of coupling agent but without the coupling accelerator show much less of a shift in a much increased coupling time.

The diene coupling accelerators useful in our invention include the presently preferred butadiene and isoprene as well as 2,3-dimethyl-1,3-butadiene, 1,3-pentadiene (piperylene), 2-ethyl-1,3-pentadiene, 1,3-hexadiene, 3-methyl-1,3-heptadiene, 1,3-octadiene, 4,5-diethyl-1,3-octadiene, 2-phenyl-1,3-butadiene, and the like. Conjugated dienes containing halogen and alkoxy substituents can be employed, including chloroprene, fluoroprene, 2-methoxy-1,3-butadiene, 2-ethoxy-3-ethyl-1,3-butadiene, and 2-ethoxy-3-methyl-1,3-hexadiene, and the like.

The silicic compounds which can be employed in our invention include the silicon polyhalides such as silicon tetrachloride, silicon tetrabromide, and silicon tetraiodide, and also silanes and open chain and cyclic siloxanes. The silanes contain one silicon atom per molecule and the open chain siloxanes contain two to 12 silicon atoms per molecule while the cyclic siloxanes have three to six silicon atoms per molecule. The silicon tetrahalides and silanes can be represented by the formula $R_nSiX_{4-n}$, wherein R is hydrogen or an alkyl, cyclo-alkyl, aryl, alkaryl, or aralkyl radical containing from 1 to 20 carbon atoms, X is halogen or YR wherein Y is O, NR or S, and n is an integer of from 0 to 2. The silanes must contain at least two of the reactive groups of halogen, —OR, —NR$_2$ or —SR.

The open chain siloxanes can be represented by the formula $$R_{3-a}X_aSiO(SiR_{2-b}X_bO)_qSiX_aR_{3-a}$$

wherein R and X are as above described, a is an integer of from 0 to 3, b is an integer of from 0 to 2, the sum of the a's and b's is at least 2, and q is an integer of from 0 to 10.

Cyclic siloxanes can be represented by the formula

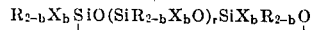

$$R_{2-b}X_b SiO(SiR_{2-b}X_bO)_rSiX_bR_{2-b}O$$

wherein R, X, and b are as above described, the sum of the b's is at least 2, and r is an integer of from 1 to 4. It can be seen from the above formulas that the siloxanes, both the open chain and the cyclic compounds, also contain at least 2 of the reactive substituents, halogen, —OR, —NR$_2$ or —SR.

Examples of the silicic compounds include the following:

trifluorosilane,
difluoro(dimethyl)silane,
diodo(didodecyl)silane,
dichloro(diphenyl)silane,
phenyl(tri-n-butoxy)silane,
tetradodecoxysilane (dodecyl orthosilicate),
phenyl-tri(phenylmercapto)silane,
methyl-tri(methylamino)silane,
diphenyl-di(dieicosylamino)silane,
hexamethoxydisiloxane,
[1,1,5,5,9,9-hexa(ethoxy)1,9-diethyl]pentasiloxane,
3,5-dichlorotetrasiloxane,
octabromocyclotetrasiloxane,
1,1,5,5,9,9-hexachlorocyclohexasiloxane, and the like.

In preparing the polymers which contain terminally reactive alkali metal atoms, one or more conjugated diene monomers are employed. The conjugated dienes can contain from four to 12 carbon atoms per molecule, preferably four to eight carbon atoms per molecule, and more preferably 1,3-butadiene, isoprene, and piperylene. The conjugated dienes are those generally known to polymerize with an alkali metal or organoalkali metal initiator, such as the conjugated dienes listed in U.S. Letters Pat. No. 3,244,664 to Robert P. Zelinski et al., issued Apr. 5, 1966, assigned to Phillips Petroleum Company, at column 2 lines 18 to 35. Conjugated dienes containing halogen and alkoxy substituents along the chain also can be employed, including chloroprene, fluoroprene, 2-methoxy-1,3-butadiene, 2-ethoxy-3-ethyl-1,3-butadiene, and 2-ethoxy-3-methyl-1,3-hexadiene.

In addition to one or more conjugated dienes, one or more aromatic compounds are polymerized to provide the necessary terminal moieties. The vinyl-substituted aromatic compounds include those known to polymerize with conjugated dienes and alkali metal or organoalkali metal initiators, particularly styrene, 1-vinylnaphthalene, 2-vinylnaphthalene, and alkyl, cycloalkyl, aryl, alkaryl, aralkyl, alkoxy, arloxy, and dialkylamino derivatives thereof in which the total number of carbon atoms in the combined substituents is generally not greater than 12. Examples of these aromatic monomers include 3-methylstyrene, 4-dodecylstyrene, 4-cyclohexylstyrene, 4-phenylstyrene, 4-(4-phenyl-n-butyl)-styrene, styrene, 3-(4-n-hexylphenyl)styrene, 4-methoxystyrene, 3,5-diphenoxystyrene, 3,5-diethylaminostyrene, 8-phenyl-1-vinylnaphthalene, 6-phenoxy-1-vinyl-naphthalene, 3,6-dimethylamino-1-vinylnaphthalene, and the like. These vinyl-substituted aromatic compounds can be used to form homopolymers or copolymers including block copolymers with conjugated dienes.

The alkali metal and organoalkali metal initiators employed for preparing the polymers are those known to polymerize conjugated dienes and vinyl-substituted aromatic compounds. The alkali metals include lithium, sodium, potassium, rubidium, and cesium, though lithium is much preferred. The preferred organoalkali metal initiators can be represented by $R'M_x$ where $R'$ is hydrocarbyl radical selected from aliphatic, cycloaliphatic, and aromatic radicals, M is an alkali metal including sodium, potassium, lithium, cesium and rubidium, preferably lithium, and $x$ is an integer of 1 to 4, preferably 2 or 3. The hydrocarbyl radical $R'$ contains from one to 20 carbon atoms. Examples of such organic alkali metal initiators include: methyllithium, n-butyllithium, cyclohexyllithium, 4-cyclohexylbutylpotassium, isopropylrubidium, 4-phenylbutylcesium, 1,20-dilithioeicosane, disodionaphthalene, and the like.

The amount of initiator which can be used varies depending upon the polymer prepared and the molecular weight desired, though usually between 0.25 and about 100 millimoles of initiator per 100 grams of monomer are employed. Formation of the terminally reactive polymers generally is carried out in the range of between −100° and +150° C., preferably between −75° and +75° C., and preferably in the presence of a suitable diluent selected from hydrocarbons including paraffins, cycloparaffins, and aromatics containing from four to 10 carbon atoms per molecule. Minor amounts of other materials can be present such as ethers in which the initiators are frequently dissolved, polar compounds such as tetrahydrofuran charged to encourage random copolymerization, and the like.

The data presented in our specification clearly demonstrate the improvement effected by adding a small amount of a conjugated diene as a coupling accelerator in the coupling of metal-terminated polymers by means of silicon-containing coupling agents. A polymer having higher inherent viscosity and higher Mooney value is produced in a time which is fractional compared to equivalent runs made without our coupling accelerator. GPC analyses further demonstrate that an improved polymodal polymer is produced by our method.

Certainly, reasonable variations and modifications of our invention are possible yet still within the scope of our disclosure and without departing from the intended scope and spirit thereof.

We claim:

1. In the process of coupling an alkali metal-terminated polymer with a silicic coupling agent, wherein said alkali metal-terminated polymer is derived from a polymerizable conjugated diene and said polymer further contains a terminal moiety derived from a polymerizable vinyl-substituted aromatic compound, the improvement which comprises adding a minor effective amount of at least one conjugated diene coupling accelerator to said alkali metal-terminated polymer, wherein said minor effective amount of at least one conjugated diene coupling accelerator is at least about 0.5 mole per gram equivalent of said alkali metal present in said alkali metal-terminated polymer, and said conjugated diene coupling accelerator contains from four to 12 carbon atoms per molecule.

2. A process according to claim 1 wherein said conjugated diene coupling accelerator is added to said alkali metal-terminated polymer at a time at least one of prior to, substantially coincident with, and shortly subsequent to the addition of said silicic coupling agent.

3. A process according to claim 2 wherein said conjugated diene coupling accelerator contains from four to eight carbon atoms per molecule.

4. A process according to claim 3 wherein said minor effective amount of at least one conjugated diene coupling accelerator is from 0.5 to 20 moles.

5. A process according to claim 4 wherein said polymer is a copolymer of a conjugated diene containing up to 12 carbon atoms per molecule and a vinyl-substituted aromatic compound containing up to 12 carbon atoms in combined substituents, wherein said silicic coupling agent is silicon polyhalide, silane containing at least two reactive groups, open chain siloxane of up to 12 silicon atoms per molecule, or cyclic siloxane of up to 6 silicon atoms per molecule.

6. A process according to claim 5 wherein said silicic coupling agent is a siloxane or $R_nSiX_{4-m}$ wherein R is hydrogen or an alkyl, cycloalkyl, aryl, alkaryl, or aralkyl radical containing from 1 to 20 carbon atoms, X is halogen or YR wherein Y is O, NR or S, and $n$ is an integer from 0 to 2.

7. A process according to claim 6 wherein said silicic coupling agent is $R_nSiX_{4-m}$.

8. A process according to claim 7 wherein said alkali metal is lithium, and said $R_nSiX_{4-n}$ is an alkyl silicon polyhalide.

9. A process according to claim 8 wherein said conjugated diene is butadiene or isoprene, said alkyl group is methyl, and $n = 1$.

10. A process according to claim 8 wherein said vinyl-substituted aromatic compound is styrene, said alkyl group is methyl, and $n = 1$.

11. A process according to claim 5 wherein said silicic coupling agent is said open chain siloxane or said cyclic siloxane, said open chain siloxane can be represented by the general formula $$R_{3-a}X_a SiO(SiR_{2-b}X_b O)_q SiX_a R_{3-a}$$

and said cyclic siloxane can be represented by the general formula:

$$R_{2-b}X_b SiO(SiR_{2-b}X_b O)_r SiX_b R_{2-b}O$$

wherein each R is hydrogen or alkyl, cycloalkyl, aryl, alkaryl, or aralkyl radical containing from one to 20 carbon atoms per R group, X is halogen or YR wherein Y is O, NR or S, $a$ is 0 or an integer up to 3, $b$ is 0 or an integer up to 2, such that the sum of $a$'s and $b$'s is at least 2, $q$ is 0 or an integer up to 10, and $r$ is an integer of 1 to 4.

12. A process according to claim 2 wherein said conjugated diene coupling accelerator is butadiene; isoprene; 2,3-dimethyl-1,3-butadiene; piperylene; 2-ethyl-1,3-pentadiene; 1,3-hexadiene; 3-methyl-1,3-heptadiene; 1,3-octadiene; 4,5-diethyl-1,3-octadiene; 2-phenyl-1,3-butadiene; chloroprene; fluoroprene; 2-methoxy-1,3-butadiene; 2-ethoxy-3-ethyl-1,3-butadiene; or 2-ethoxy-3-methyl-1,3-hexadiene.

* * * * *

UNITED STATES PATENT OFFICE

20500 LHC

CERTIFICATE OF CORRECTION

Patent No. 3,692,874  Ralph C. Farrar and Clinton F. Wofford     Dated 9-2-72

It is certified that error appears in the above-identified patent and that said Letters Patent are hereby corrected as shown below:

Column 6, Claim 7, line 58 (line 2 of claim 7) period should be at end of line.

Column 6, Claim 8, line 60 (line 2 of claim 8) "$R_n SiX4_n$" should read

--- $R_n SiX_{4-n}$

On the face of the patent, the patent should be assigned to Phillips Petroleum Company.

Signed and sealed this 17th day of April 1973.

(SEAL)
Attest:

EDWARD M. FLETCHER, JR.
Attesting Officer

ROBERT GOTTSCHALK
Commissioner of Patents